S. H. GARST.
FERTILIZER DISTRIBUTER.
APPLICATION FILED MAY 7, 1915.
1,210,636.
Patented Jan. 2, 1917.
2 SHEETS—SHEET 1.
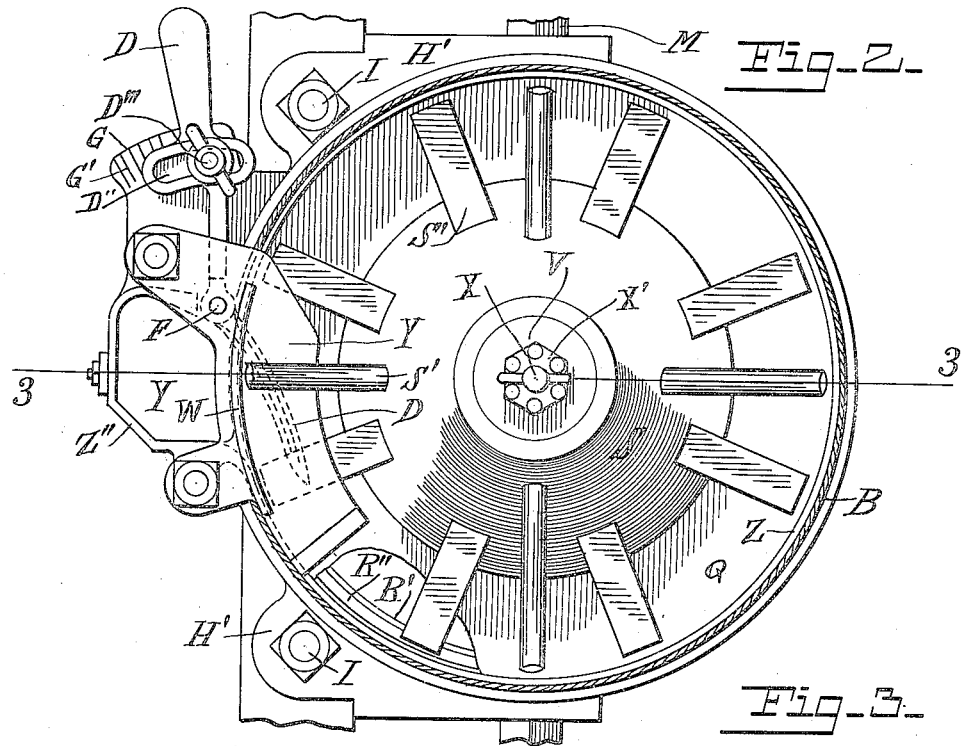
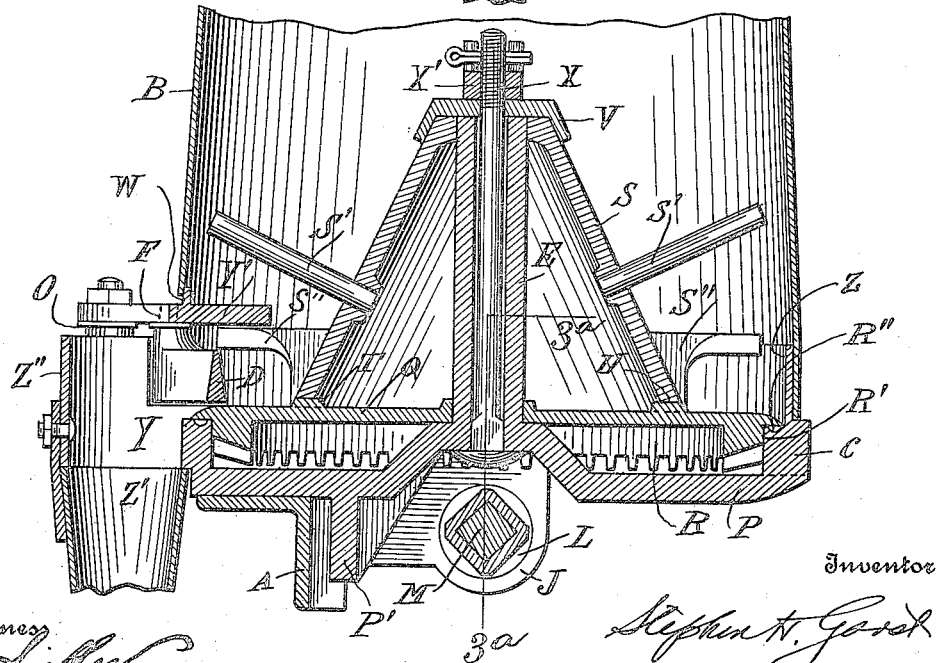

S. H. GARST.
FERTILIZER DISTRIBUTER.
APPLICATION FILED MAY 7, 1915.
1,210,636.
Patented Jan. 2, 1917.
2 SHEETS—SHEET 2.
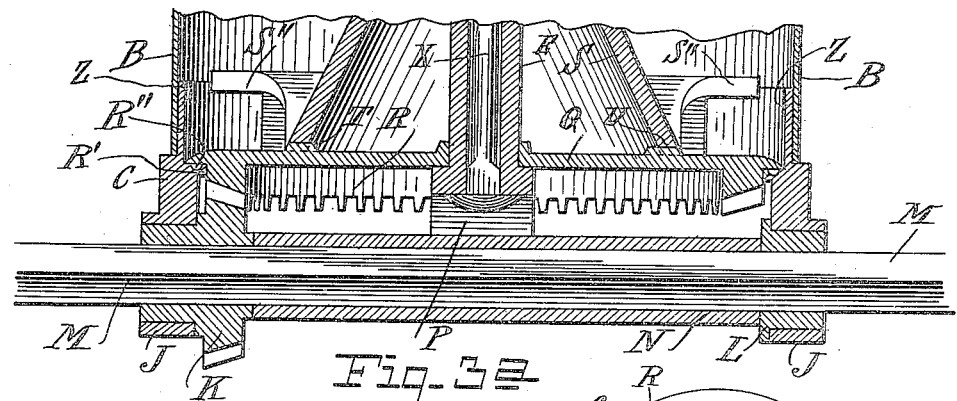
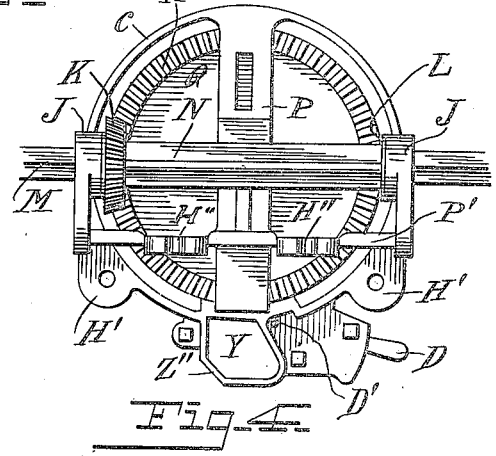
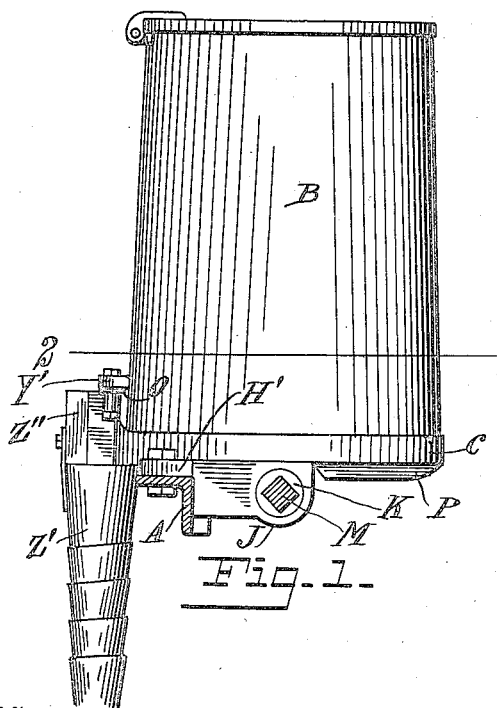
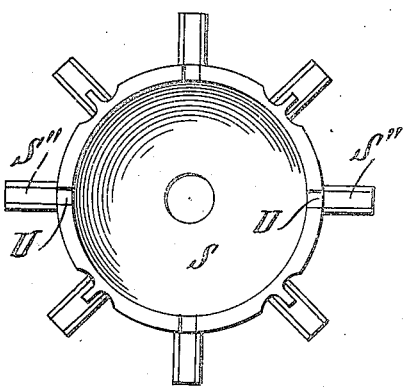

UNITED STATES PATENT OFFICE.

STEPHEN H. GARST, OF MOLINE, ILLINOIS.

FERTILIZER-DISTRIBUTER.

1,210,636. Specification of Letters Patent. Patented Jan. 2, 1917.

Application filed May 7, 1915. Serial No. 26,459.

*To all whom it may concern:*

Be it known that I, STEPHEN H. GARST, a citizen of the United States, residing at Moline, in the county of Rock Island and State of Illinois, have invented certain new and useful Improvements in Fertilizer-Distributers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to certain improvements in attachments to seed planters and comprises, more specifically, certain improvements in the fertilizer distributer.

The object of the present invention is to improve features of the feed hopper in the particulars hereinafter described and claimed. In this connection, a word regarding the nature or character of commercial fertilizer may not be out of place. Such product, as is well known, contains chemicals which have a strong affinity for the metal of which the distributer is constructed, usually cast iron or soft steel. The chemical action on the metal parts causes them to rust or corrode very rapidly and to thereby interfere materially with the efficiency of the working parts of the distributer. The fertilizer is finely pulverized and in the handling thereof it readily works into all cracks, crevices or spaces between the working parts of the machine that it comes in contact with. The result is that it adheres to the surfaces of the working parts of the distributer and where there is any pressure or friction against the fertilizer-covered surface, where two plates or parts work together for example, the fertilizer becomes caked or gummed onto the metal in a condition almost as hard as the metal itself. In such cases it becomes necessary to take the working parts apart in order to scrape the caked or gummed fertilizer therefrom. The problems thus attending the handling of commercial fertilizer have heretofore been well known and various efforts have been put forth to overcome the difficulty with but small or partial success.

The principal object of the present invention is to overcome such difficulty through and by a construction and arrangement which eliminates all parts that have a tendency to produce friction or work near enough together to become clogged or gummed up by the fertilizer when in motion.

To this end my improvements comprise a rotatable hopper bottom consisting of a single plate with a conical body supported thereon. The lower surface of the bottom plate is relieved to a very material extent from frictional contact with other parts. In other words, there is no surface for the under side of said plate to come in contact with except a comparatively small central bearing at the axis of said plate which is protected above by the cone, and an inwardly-lying surface at the circumference of said plate provided with sealing means which prevents the fertilizer from working below said bottom plate to accumulate in the form of crust or cake and in a comparatively short time interfere to bind the parts to such an extent that the tractor wheels of the machine would fail to drive the parts. The top of the conical member is likewise sealed from the surrounding space so that none of the fertilizer may work into the central bearing of the bottom plate from above.

These and other advantages will appear from the following description of the parts and their coöperative character.

In the accompanying drawings, Figure 1 is a side elevation of a fertilizer feed hopper containing my improvements; Fig. 2 is an enlarged sectional view on the line 2—2 of Fig. 1; Fig. 3 is a section on the line 3—3 of Fig. 2; Fig. 3ª is a section on the line 3ª—3ª of Fig. 3; Fig. 4 is a bottom plan view of the hopper and driving mechanism; and Fig. 5 is a bottom plan view of the fertilizer agitator cone.

In a detail description of the invention, similar reference characters indicate the same parts in both the description and the drawings.

As hereinbefore stated, the invention relates to an attachment to be applied to seed planters. Having to do with the fertilizer distributing devices, it is equally available for any of the well known forms of seed planters such, for example, as a one row planter or a two row planter. Seed planters being of well known constructions and the fertilizer hopper and its manner of mounting being also well understood, it has not been deemed necessary to illustrate any more of these well known structures and devices than is necessary for the purposes of a description of the structures and parts involved in the improvements. Therefore, beginning with the frame or angle bar A, this is a well known form of steel angle bar which extends transversely of the machine and is usually supported on brackets attached to the main frame of the planters and held in place by suitable braces. The fertilizer hopper B is supported on the margin of a base ring C which is made rigid to the angle bar A by bolts I which pass through openings in said angle bar and openings in ears H' that extend from said base ring C. The said base ring C is also provided with bearings J—J which receive a square shaft M lying parallel with the angle bar A and approximately as long as said angle bar. The said ring C is further provided with a cross bar P and another cross bar P' both of which are integral with said ring. The bar P' has apertures H'' through which the bolts I pass in uniting the bottom ring C to the angle bar A. Upon the shaft M, a pinion K having a square opening is mounted; also a washer L having a square opening; which pinion and washer are maintained in position by a distance-sleeve N which fits over the shaft M. The shaft M lies below the cross bar P of the bottom ring. The shaft M is the medium through which movement is imparted to the fertilizer feed devices. Its manner of operation and the means for driving the same are well known and require no illustration or extended description in connection with the present improvements. It is commonly known that the said shaft is connected to the main axle of the planter by means of sprocket wheels, chains, clutch devices, and other well known instrumentalities. Above the cross bar P and within the base ring C, a revolving plate Q is located, said plate being in effect the bottom of the hopper. The underside of the plate Q is provided with gear teeth R which extend around the margin of said plate and engage the pinion K, and thus the said plate Q is rotated. The inside of the periphery of the bottom ring C, just above the bearings J—J, is provided with an inwardly lying shoulder R' the upper side of which has an annular groove R'' which is overlapped by the outer edge of the bottom plate Q. This groove R'' will fill up with the fertilizer and act as a packing ring between the shoulder R and the revolving bottom Q, thus preventing the fertilizer leaking out at this point. A cone-shaped casting S provided with agitator arms S' and S'' is supported within the hopper on said botttom plate Q and revolves with said bottom plate around a post E as a center. Small projections T are cast integral with the top side of said bottom plate and these fit in corresponding cavities U cast on the bottom of the cone S so that the said cone is detachably mounted on the bottom plate Q and revolves therewith. The lower arms S'' of the cone S pass over the top of a feed lever D and beneath a covering or cap plate Y', to be again referred to. It will be seen that this lower series of agitator arms S'' extends relatively close to the inner side of the hopper and is instrumental in agitating or loosening the fertilizer at the point within the hopper where it is engaged by the blade D. A comparatively thin wall of the fertilizer is thus unaffected at the bottom of the hopper. The center post E extends from the cross bar P of the bottom ring and reaches slightly above the top of the cone S. A cap V is supported on the top of the post E and incloses the top of the cone S, the fit between said cap and cone being such as will not interfere with the free rotation of the cone. The cap V is tightened down upon the post E by means of a bolt X which extends through said post and the head of which lies against the underside of the cross bar P. A lock nut X' rigidly secures the cap V. The cone S and bottom plate Q are thus constructed and arranged to be revolved by the pinion K. On the front side of the bottom ring C, an outlet Y is provided which consists of an outward extension Z'' of the flange Z which extends from the base ring C. This extension Z'' forms an opening through which the fertilizer passes from the hopper to the discharge spout Z' and is delivered thereby to the ground. At the top of the outlet Y is secured the covering plate or cap Y' which covers the inner part of the opening so that none of the fertilizer can work into said opening from the top or space above the agitator arms S'' but must enter from the side or below said top plate. At one side of the outlet Y, there is an opening D' in the flange Z in which the pivot pin of the feed lever D is located. This lever is in the form of a blade and will decrease or increase the amount of fertilizer delivered to the spout Z' according to its position. The said lever is provided with an oblong opening D'' lying crosswise, a clamping bolt with nut D''', and pivot pin F, by means of which the said lever can be shifted and held in different positions. The inner end of the said lever D is provided with a point which becomes wider or like a blade as it approaches the opening D''. On the outer side of said lever is an index G and, on the plate below, a set of graduations G' is arranged which serve to indicate the position of the inner end of the feed lever D.

Having described the construction of my improved fertilizer attachment, I will now briefly outline its operation. The fertilizer is placed in the hopper B and the machine thrown into gear in the usual way. As the machine moves forward, the square shaft M is turned and the pinion K thereon causes the bottom plate Q and the cone S to rotate in unison. As the bottom plate and cone are revolved, the fertilizer is carried around against the point of the lever D, which diverts a portion of the fertilizer in an outward direction and causes it to pass through the outlet Y and into the spout Z'. The action of the cone S is similar to an auger in the bottom of a hopper filled with fertilizer. In a word, it bores out the center of the fertilizer as it revolves and forces the fertilizer to the outside of the hopper where it comes in the direct path of the feed regulating device or lever D. The supporting edge of the column of the fertilizer contents of the hopper being thin, it crumbles easily under the weight above, which insures a steady feed downward and prevents lodging or bridging of the fertilizer in the hopper. In the rotation of the cone S, the lower arms S" pass over the top of the feed lever D and beneath the cap Y' and carry out a portion of the fertilizer. This amount of fertilizer can be regulated by the distance between the cap Y' and the feed lever D, hence the cap is provided with means to raise and lower it, consisting in placing washers O—O at the three points of support, to-wit, the two bolts of the cap plate Y' and the pivot of the feed blade. The flange W on the upper side of the cap plate seals the hopper at this point and the said flange is of sufficient depth to enable the feed to be regulated by the use of washers as described without interfering with said seal.

Having described my invention, I claim.

1. In a fertilizer distributer, the combination of a hopper, a ring at the base of said hopper forming a support therefor, said ring having an annular groove in the upper horizontal surface thereof which lies within the circumference of the hopper and is adapted to receive fertilizer to form a seal, a rotatable bottom below said hopper having its circumference supported on said ring and extended over the groove therein and coöperating with said groove in forming said seal, substantially as specified.

2. In a fertilizer distributer, a hopper, a base member having an upturned annular margin upon which said hopper is supported and a tubular post extending vertically from the axis thereof, said upturned annular margin having a groove in the upper surface thereof, a rotatable bottom below said hopper having its margin extended over the upturned margin of the base member and coöperating with the groove in said base member in forming a seal, said rotatable bottom being supported on said base member at the base of said tubular post and on the upturned annular margin of the base member, and a conical shaped body mounted on said rotatable bottom and having a bearing on the upper end of said tubular post, substantially as specified.

3. In a fertilizer distributer, a seed hopper, a base member supporting said hopper consisting of a ring and a cross-bar dropped below said ring and extending across the opening therein, said ring having an annular groove in the upper surface thereof, a tubular column extending vertically from the middle portion of said bar, a rotatable bottom in said hopper having an axial bearing at the base of said tubular column, and a circumferential bearing on the ring portion of said base member, a conical body supported on said rotatable bottom and having a bearing on the upper portion of said tubular column, and a cap having a downwardly extended rim inclosing the upper end of the tubular column and the conical body, substantially as specified.

4. In a fertilizer distributer, the combination of a hopper, a base member supporting said hopper and consisting of an annular member C having a groove R" in its upper side and a cross-bar P extending from opposite sides thereof, said crossbar terminating at its middle portion in a vertical tubular column E, a rotatable bottom Q supported on said tubular column at the base thereof and having its circumferential edge overlapping the ring C and inclosing the groove therein, a conical member S supported on said bottom Q and having a central bearing on the upper portion of said tubular column E, a cap V inclosing the upper ends of said tubular column and said conical member S, a bolt extending through said tubular column above said cap, and a nut engaging said bolt and maintaining said cap in a rigid position.

In testimony whereof I affix my signature, in presence of two witnesses.

STEPHEN H. GARST.

Witnesses:
E. E. ENGLUND,
W. J. DAVIS.